United States Patent
Kim et al.

(10) Patent No.: US 9,674,370 B2
(45) Date of Patent: Jun. 6, 2017

(54) DEVICE AND METHOD FOR PROVIDING VEHICLE ACCIDENT INFORMATION

(71) Applicant: HYUNDAI MOTOR COMPANY, Seoul (KR)

(72) Inventors: Seon Su Kim, Seongnam-si (KR); Jangyong Lee, Jeollabuk-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/854,014

(22) Filed: Sep. 14, 2015

(65) Prior Publication Data

US 2016/0272140 A1   Sep. 22, 2016

(30) Foreign Application Priority Data

Mar. 16, 2015   (KR) .................. 10-2015-0035980

(51) Int. Cl.
  *H04M 11/04*   (2006.01)
  *G08B 25/00*   (2006.01)
  *G08B 25/01*   (2006.01)
  *B60R 21/00*   (2006.01)

(52) U.S. Cl.
  CPC ........... *H04M 11/04* (2013.01); *G08B 25/004* (2013.01); *G08B 25/009* (2013.01); *G08B 25/016* (2013.01); *B60R 2021/0027* (2013.01)

(58) Field of Classification Search
  CPC ...... H04M 11/04; H04M 11/045; H04W 4/22; H04Q 9/00; B60R 21/013; B60R 2021/0027; G08B 25/016; G08G 1/205; G07C 5/008

USPC .......... 340/436, 439, 506, 539.13; 455/404.2
See application file for complete search history.

(56) References Cited

U.S. PATENT DOCUMENTS

| | | | |
|---|---|---|---|
| 9,147,353 B1 * | 9/2015 | Slusar | G09B 19/167 |
| 2006/0033615 A1 * | 2/2006 | Nou | G08B 13/19647 340/539.13 |
| 2016/0086285 A1 * | 3/2016 | Jordan Peters | G06Q 40/08 705/4 |
| 2016/0094964 A1 * | 3/2016 | Barfield, Jr. | H04W 4/22 455/404.2 |

FOREIGN PATENT DOCUMENTS

| | | |
|---|---|---|
| KR | 10-1121830 B1 | 3/2012 |
| KR | 10-2015-0019288 A | 2/2015 |

\* cited by examiner

*Primary Examiner* — Hung T Nguyen
(74) *Attorney, Agent, or Firm* — McDermott Will & Emery LLP

(57) ABSTRACT

A device for providing vehicle accident information comprises a memory configured to store a plurality of instructions; and a processor configured to process the plurality of instructions, wherein execution of the plurality of instructions causes the processor to perform following steps of detecting a vehicle accident using a vehicle terminal device wirelessly connected to a server, collecting accident information using the vehicle terminal device when the vehicle accident is detected, transmitting the accident information to the server using the vehicle terminal device, collecting context information using a mobile device wirelessly connected to the server, and transmitting the context information to the server using the mobile device.

8 Claims, 4 Drawing Sheets

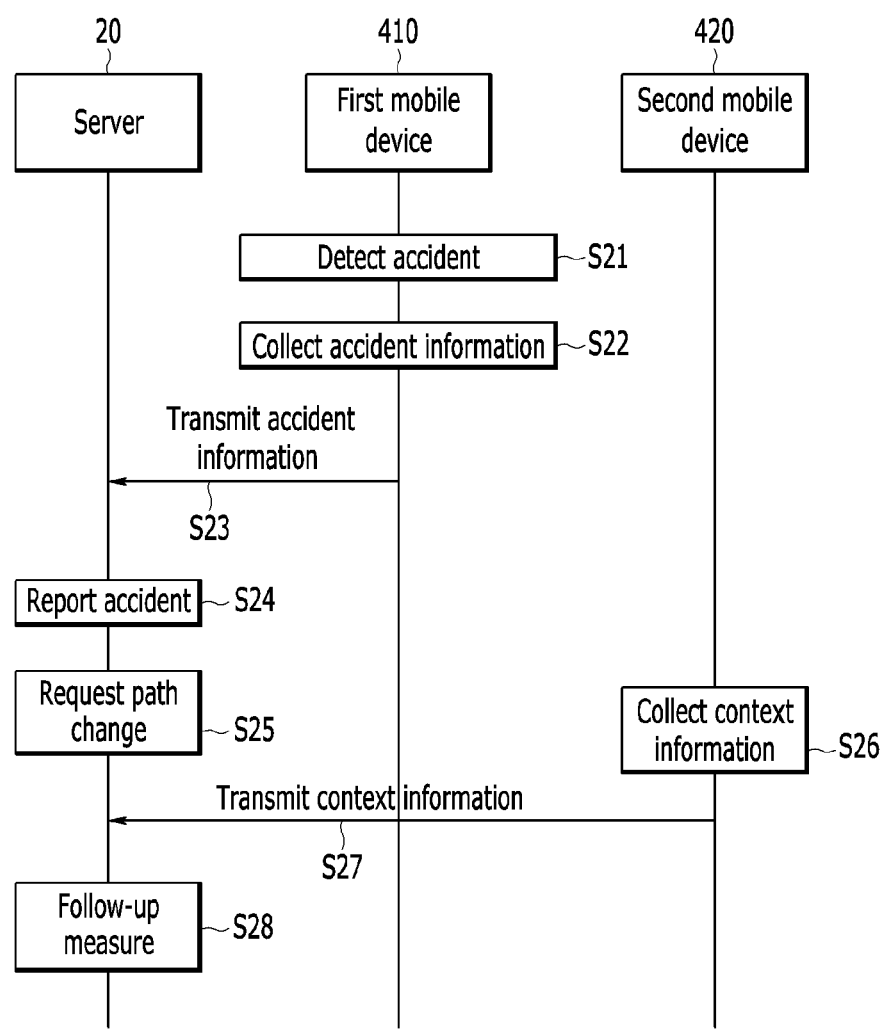

DEVICE AND METHOD FOR PROVIDING VEHICLE ACCIDENT INFORMATION

CROSS-REFERENCE TO RELATED APPLICATION

This application claims the benefit of priority to Korean Patent Application No. 10-2015-0035980, filed in the Korean Intellectual Property Office on Mar. 16, 2015, the entire content of which is incorporated herein by reference.

TECHNICAL FIELD

The present disclosure relates to a device and method for providing vehicle accident information.

BACKGROUND

In the related art, when an emergency condition occurs internal/external to a vehicle, the vehicle may notify a person or agency of the emergency condition using a preset by a driver using a telematics device of the vehicle.

However, in the related art, when an accident of the vehicle occurs, the telematics device of the vehicle may transmit accident occurrence information to the person or the agency remotely, but the vehicle does not collect or transmit the information after the accident occurrence.

In addition, if power is not supplied to the telematics device of the vehicle or the telematics device of the vehicle is damaged due to the accident, it may be difficult to transmit information to the person or the agency remotely even if the information after the accident occurrence is collected.

Accordingly, it may be difficult to take proper measures for the emergency condition occurring internal/external to the vehicle, and it may be difficult to respond rapidly to an emergency.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to rapidly respond to a vehicle internal/external condition when a vehicle accident occurs.

Further, the present disclosure has been made in an effort to improve rescue efficiency of an occupant when a vehicle accident occurs.

The present inventive concept can be used to achieve other effects that are not described in detail in addition to the aforementioned effects.

An exemplary embodiment of the present inventive concept provides a device for providing vehicle accident information, comprising a memory configured to store a plurality of instructions; and a processor configured to process the plurality of instructions, wherein execution of the plurality of instructions causes the processor to perform following steps of detecting a vehicle accident using a vehicle terminal device wirelessly connected to a server, collecting accident information using the vehicle terminal device when the vehicle accident is detected, transmitting the accident information to the server using the vehicle terminal device, collecting context information using a mobile device wirelessly connected to the server, and transmitting the context information to the server using the mobile device.

The execution of the plurality of instructions may further cause the processor to set the mobile device based on an initial condition.

The initial condition may include at least one of a power-off and a detection of a failure of the vehicle terminal device.

The execution of the plurality of instructions may further cause the processor to set the mobile device according to a request of the server.

The initial condition may include one or more selected from the group consisting of wireless signal strength, number of connections with the server, recent connection time with the server, and a battery charge amount.

The accident information may include at least one of a position of the vehicle and an accident image.

The context information may include at least one selected from the group consisting of a position of the vehicle, an accident image, an accident sound, or biological information of an occupant of the vehicle.

The server may analyze at least one of the accident information and the context information, and notify an accident related agency of the vehicle accident.

A method for providing vehicle accident information comprises steps of detecting a vehicle accident using a vehicle terminal device wirelessly connected to a server; collecting accident information using the vehicle terminal device when the accident is detected; transmitting the accident information to the server; connecting a mobile device to the server when a power-off or a failure of the vehicle terminal device is detected; collecting context information using the mobile device; and transmitting the context information to the server.

The step of connecting the mobile device to the server may include setting the mobile device based on an initial condition.

The initial condition may include at least one selected from the group consisting of wireless signal strength, number of connections with the server, recent connection time with the server, and battery charge amount.

The accident information may include at least one of a position of the vehicle and an accident image.

The context information may include at least one selected from the group consisting of a position of the vehicle, an accident image, an accident sound, and biological information of an occupant of the vehicle.

According to the exemplary embodiment of the present inventive concept, when the vehicle accident occurs, a vehicle internal/external condition can be rapidly taken in consideration, and rescue efficiency of an occupant can be improved in consideration of a condition of the vehicle occupant.

BRIEF DESCRIPTION OF THE DRAWINGS

FIG. 4 is a flowchart of a method for providing vehicle accident information by using a mobile device according to an exemplary embodiment of the present inventive concept.

DETAILED DESCRIPTION

Figure 1:
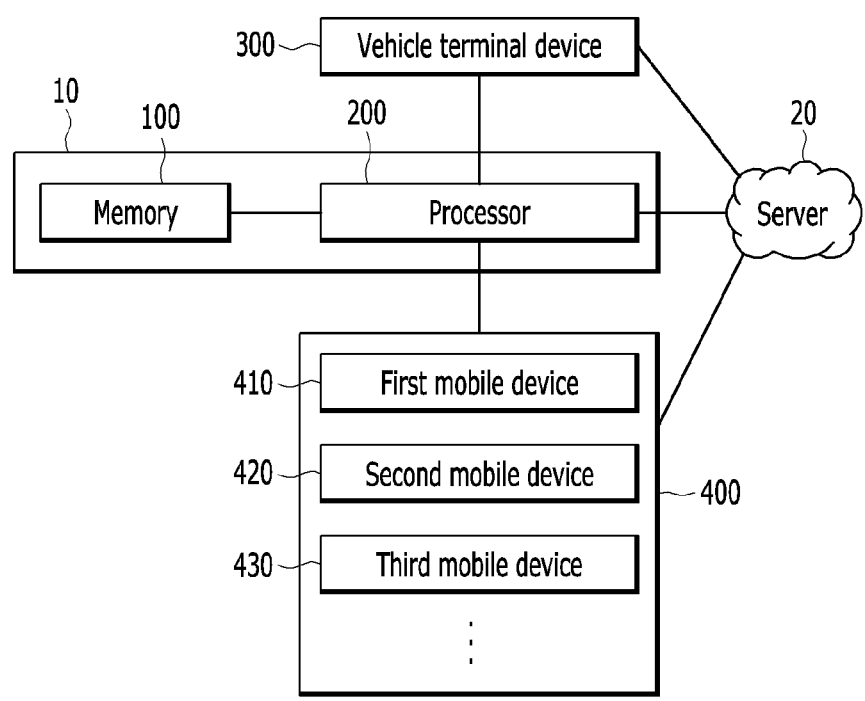
FIG. 1 is a block diagram of a device for providing vehicle accident information according to an exemplary embodiment of the present inventive concept.

In the following detailed description, only certain exemplary embodiments of the present inventive concept have been shown and described, simply by way of illustration.

As those skilled in the art would realize, the described embodiments may be modified in various different ways, all without departing from the spirit or scope of the present inventive concept.

Accordingly, the drawings and description are to be regarded as illustrative in nature and not restrictive.

Like reference numerals designate like elements throughout the specification.

In addition, detailed description of widely known technologies will be omitted.

Further, in the entire specification, unless explicitly described to the contrary, the word "comprise" and variations such as "comprises" or "comprising" will be understood to imply the inclusion of stated elements but not the exclusion of any other elements.

In the specification, a computer system is a programmable electronic device, and it is a machine for processing input data, storing and searching processed information, and outputting a result.

In the specification, an instruction is stored in a memory of a computer, it is calculated and processed by a processor of the computer, and it means the logical part of the program that performs a specific function in the computer.

In the specification, a memory may include a non-volatile memory, such as a high-speed random access memory, a magnetic disk storage device, a flash memory device, and a non-volatile solid-state memory device.

In the specification, an accident means an emergency condition of the inside and outside of a vehicle, and includes one of a bump and a crash accident of the vehicle, a fire in the vehicle, or a failure of a major component of the vehicle.

FIG. 1 is a block diagram of a device for providing vehicle accident information according to an exemplary embodiment of the present inventive concept.

A device for providing vehicle accident information 10 of FIG. 1 includes a memory 100 storing a plurality of instructions, and a processor 200 connected to the memory 100 and reacting to the plurality of instructions.

Here, a vehicle terminal device 300 and a mobile device 400 are connected to the processor 200, and they are connected to a remote server 20 through the wireless communication network.

For example, a device for providing vehicle accident information 10 may be device implemented in a computer system.

Figure 2:
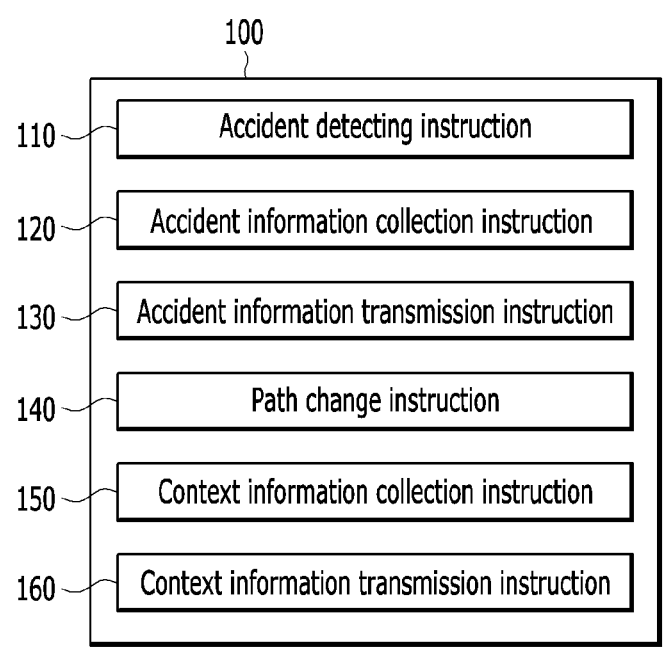
FIG. 2 is a block diagram of a memory of FIG. 1.

FIG. 2 is a block diagram of a memory of FIG. 1.

The memory 100 of FIG. 2 includes an accident detecting instruction 110, an accident information collection instruction 120, an accident information transmission instruction 130, a path change instruction 140, a context information collection instruction 150, and a context information transmission instruction 160.

The accident detecting instruction 110 detects a vehicle accident using the vehicle terminal device 300.

The vehicle terminal device 300 detects the vehicle accident using a plurality of sensors or cameras.

In addition, when an occupant controls a specific button (SOS button) of the vehicle, the vehicle accident is detected.

For example, when an impact of a vehicle is detected through an impact detecting sensor installed in the vehicle or inflating of an air bag, it can be determined that a crash or bump accident has occurred.

The vehicle terminal device 300 may be a telematics device.

The accident detecting instruction 110 detects the vehicle accident using the mobile device 400.

The mobile device 400 includes a plurality of mobile devices 410, 420, and 430, and may be a portable terminal owned by a driver or a passenger or a wearable terminal attached to a body portion of the driver or the passenger.

In this case, the portable terminal provides one of voice calls, image calls, or wireless communication, and the portable terminal may include a camera.

In addition, the wearable terminal may include one of sensors sensing biological information of the driver or the passenger.

The accident detecting instruction 110 detects the vehicle accident using a first mobile device 410 of the driver.

The first mobile device 410 of the driver detects the vehicle accident using a plurality of sensors, cameras, or preinstalled accident detecting programs (applications).

For example, when an impact is detected through an acceleration sensor, or when a vehicle speed change similar to a preset pattern is detected with the driver in the vehicle, it can be determined that the crash or bump accident has occurred.

In this case, the presence of the driver may be detected through automatic pairing of a vehicle head unit and the first mobile device 410 or a driving mode setting by using the first mobile device 410.

When the vehicle accident is detected through the accident detecting instruction 110, the accident information collection instruction 120 collects information related to the vehicle accident (hereinafter referred to as accident information).

In this case, the accident information collection instruction 120 collects the accident information by using the vehicle terminal device 300 or the mobile device 400 that detects the vehicle accident.

For example, the accident information collection instruction 120 may collect current location information using a GPS (global positioning system) or may collect an image of an image recording device for a vehicle (a vehicle black box).

The accident information transmission instruction 130 transmits the accident information to the server 20.

In this case, the accident information transmission instruction 130 transmits the accident information to the server 20 using the vehicle terminal device 300 or the mobile device 400 that detects the vehicle accident.

The path change instruction 140 changes an information transmission path according to a path change request of the server 20.

Specifically, after the vehicle terminal device 300 or the mobile device 400 detects the vehicle accident, a different device may collect and transmit spot information (hereinafter referred to as context information) after an accident.

The path change instruction 140 may set the context information collecting and transmitting device according to an initial condition.

For example, when a power-off or a failure according to the vehicle accident of the vehicle terminal device 300 that transmits the accident information is detected, it may set the mobile device 400 as the context information collecting and transmitting device.

In addition, when a power-off or a failure according to the vehicle accident of the first mobile device 410 that transmits the accident information is detected, it may set the other mobile devices 420 and 430 as the context information collecting and transmitting device.

The path change instruction 140 may set the context information collecting and transmitting device through the accident information transmission instruction 120, as soon as the accident information is transmitted to the server 20.

The path change instruction 140 may set at least one of mobile devices 410, 420, and 430 satisfying the initial condition among a plurality of mobile devices as the context information collecting and transmitting device.

In this case, the condition can be set as follows, and at least one or more conditions can be set.

Condition 1) A mobile device having the strongest wireless signal strength

Condition 2) A mobile device having the largest number of connections with the server Condition 3) A mobile device that was most recently connected with the server through the wireless communication network Condition 4) A mobile device having the highest battery charge amount Condition 5) A mobile device of a vehicle driver that is preset For example, when the Condition 2 is a setting condition of the context information collecting and transmitting device, a mobile device having the largest number of connections with the server 20 among the plurality of mobile devices 410, 420, and 430 can be set as the context information collecting and transmitting device.

In this case, when there is no mobile device that has connected with the server 20 at least once, all mobile devices can be set as the context information collecting and transmitting device.

The context information collection instruction 150 collects the context information in real time by using the mobile devices 410, 420, and 430 that are set as the context information collecting and transmitting device through a path change instruction 140.

In this case, the context information includes all information which may be collected by the mobile devices 410, 420, and 430.

For example, the context information can include at least one of a vehicle position, an accident image, an accident sound, or biological information of an occupant (temperature, pulse, respiration, blood sugar, brain wave, fatigue index, etc.).

The context information transmission instruction 160 transmits the context information collected through the context information collection instruction 150 to the server 20.

In addition, it can transmit to an accident-related agency.

In this case, it transmits the context information through the mobile devices 410, 420, and 430 that collect the context information.

The server 20 requests a path change after receiving the accident information.

The server 20 receives the accident information received through the accident information transmission instruction 130, and notifies an accident occurrence to or requests a rescue by the accident-related agency.

In this case, the server 20 can notify the accident occurrence or request a rescue in accordance with the analysis result of the accident information.

For example, after receiving the accident information and reporting the nearest police station of the current position of the vehicle, and if a fire is detected by analyzing the image of an image recording device for a vehicle (a vehicle black box) in the accident information, it can request fire suppression and rescue by a fire station.

The server 20 receives context information transmitted by the context information transmission instruction 160, and analyzes the context (accident scale, fire suppression condition of accident, occurrence of casualties, etc.), and additionally requests rescuers and an ambulance from the related agency according to an analysis result.

Figure 3:
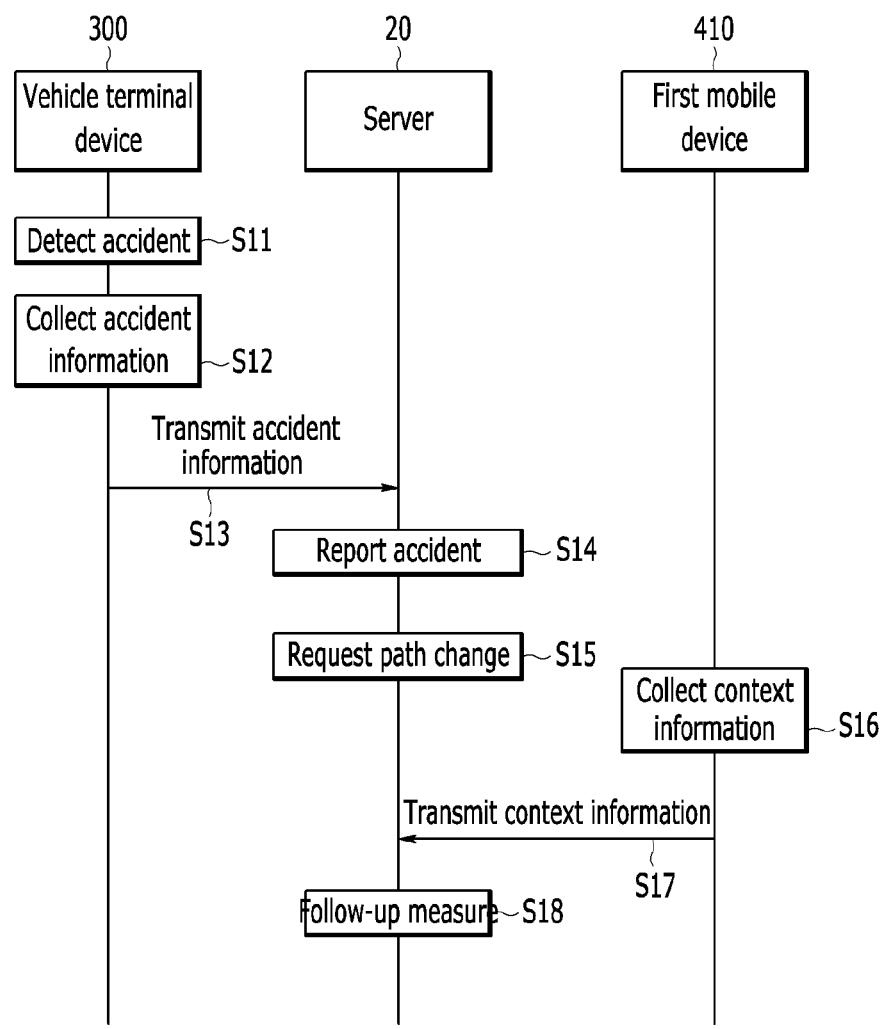
FIG. 3 is a flowchart of a method for providing vehicle accident information by using a vehicle terminal device and a mobile device according to an exemplary embodiment of the present inventive concept.

FIG. 3 is a flowchart of a method for providing vehicle accident information by using a vehicle terminal device and a mobile device according to an exemplary embodiment of the present inventive concept.

FIG. 3 shows an example of a method for providing vehicle accident information to change an information transmission path from the vehicle terminal device to the mobile device.

The vehicle terminal device 300 detects the vehicle accident through the accident detecting instruction 110 (S11).

If the vehicle accident is detected in the step S11, the vehicle terminal device 300 collects the accident information through the accident information collection instruction 120 (S12), and transmits it to the server 20 though the accident information transmission instruction 130 (S13).

The server 20 reports the accident occurrence to the related agency based on the accident information transmitted in the step S13 (S14).

The server 20 requests the path change after the step S14 or simultaneously with the step S14 (S15).

The path change instruction 140 sets the context information collecting and transmitting device (the first mobile device 410) according to the request of the server 20 of the step S15, and the first mobile device 410 collects the context information through the context information collection instruction 150 (S16).

In this case, the path change instruction 140 can set at least one mobile device satisfying the initial condition as the context information collecting and transmitting device.

The first mobile device 410 transmits the context information to the server 20 through the context information transmission instruction 160 (S17).

The server 20 performs follow-up measures by analyzing the context information transmitted in the step S17 (S18).

In this case, it analyzes the accident scale, the fire suppression condition of the accident, and occurrence of casualties based on context information, and additionally requests rescuers and an ambulance from the related agency according to the analysis result.

FIG. 4 is a flowchart of a method for providing vehicle accident information by using a mobile device according to an exemplary embodiment of the present inventive concept.

FIG. 4 shows an example of a method for providing vehicle accident information to change an information transmission path from a first mobile device to a second mobile device.

The first mobile device 410 detects the vehicle accident through the accident detecting instruction 110 (S21).

In this case, the first mobile device 410 may be a mobile device of a driver.

If the vehicle accident is detected in the step S21, the first mobile device 410 collects the accident information through the accident information collection instruction 120, and transmits it to the server 20 though the accident information transmission instruction 130 (S23).

The server 20 reports the accident occurrence to the related agency based on the accident information transmitted in the step S23 (S24).

The server 20 requests the path change after the step S24 or simultaneously with the step S24 (S25).

The path change instruction 140 sets the context information collecting and transmitting device (the second mobile device 420) according to a request of the server 20 of the step S25, and the second mobile device 420 collects the context information through the context information collection instruction 150 (S26).

In this case, the second mobile device 420 may be a mobile device of the passenger.

The path change instruction 140 can set at least one mobile device satisfying the initial condition as the context information collecting and transmitting device.

When the first mobile device 410 conducting the step S21 and the step S22 satisfies the initial condition, the path change instruction 140 sets the first mobile device 410 as the context information collecting and transmitting device, and the first mobile device 410 can collect the context information through the context information collection instruction 150 (S26).

The second mobile device 420 transmits the context information to the server 20 through the context information transmission instruction 160 (S27).

The server 20 performs follow-up measures by analyzing context information transmitted in the step S27 (S28).

In this case, it analyzes the accident scale, the fire suppression condition of the accident, and occurrence of casualties based on context information, and additionally requests rescuers and an ambulance from the related agency according to an analysis result.

According to the exemplary embodiment of the present inventive concept, when the vehicle terminal device is unable to be used due to the vehicle accident, it may collect context information in real time by using the mobile device of an occupant, and rapidly rescue victims of the accident based on the context information.

According to the exemplary embodiment of the present inventive concept, by collecting the context information of each occupant by using the mobile device of the occupant and performing follow-up measures according the context information, it is possible to reduce the casualties.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A device for providing vehicle accident information, comprising:
    a memory configured to store a plurality of instructions; and
    a processor configured to process the plurality of instructions,
    wherein execution of the plurality of instructions causes the processor to perform following steps of:
    detecting a vehicle accident using a vehicle terminal device wirelessly connected to a server,
    collecting accident information using the vehicle terminal device when the vehicle accident is detected,
    transmitting the accident information to the server using the vehicle terminal device,
    collecting context information using a mobile device wirelessly connected to the server, and
    transmitting the context information to the server using the mobile device,
    wherein the execution of the plurality of instructions further causes the processor to set the mobile device according to a request of the server based on an initial condition including at least one of recent connection time with the server and a battery charge amount.

2. The device for providing vehicle accident information of claim 1, wherein the initial condition includes at least one of a power-off and a detection of a failure of the vehicle terminal device.

3. The device for providing vehicle accident information of claim 1, wherein
    the accident information includes at least one of a position of the vehicle and an accident image.

4. The device for providing vehicle accident information of claim 1, wherein
    the context information includes at least one selected from the group consisting of a position of the vehicle, an accident image, an accident sound, or biological information of an occupant of the vehicle.

5. The device for providing vehicle accident information of claim 1, wherein
    the server analyzes at least one of the accident information and the context information, and notifies an accident related agency of the vehicle accident.

6. A method for providing vehicle accident information, comprising steps of:
    detecting a vehicle accident using a vehicle terminal device wirelessly connected to a server;
    collecting accident information using the vehicle terminal device when the accident is detected;
    transmitting the accident information to the server;
    connecting a mobile device to the server when a power-off or a failure of the vehicle terminal device is detected;
    collecting context information using the mobile device; and
    transmitting the context information to the server,
    wherein the step of connecting the mobile device to the server includes setting the mobile device based on an initial condition, wherein the initial condition includes at least one of recent connection time with the server and a battery charge amount.

7. The method for providing vehicle accident information of claim 6, wherein
    the accident information includes at least one of a position of the vehicle and an accident image.

8. The method for providing vehicle accident information of claim 6, wherein
    the context information includes at least one selected from the group consisting of a position of the vehicle, an accident image, an accident sound, and biological information of an occupant of the vehicle.

* * * * *